C. S. TIPTON.
SADDLE.
APPLICATION FILED NOV. 13, 1915.

1,187,942.

Patented June 20, 1916.

C S Tipton — Inventor

Witnesses

By W. J. Fitzgerald
Attorney

UNITED STATES PATENT OFFICE.

CHARLES SAGER TIPTON, OF DENVER, COLORADO, ASSIGNOR TO THE FRED MUELLER SADDLE & HARNESS COMPANY, OF DENVER, COLORADO.

SADDLE.

1,187,942.        Specification of Letters Patent.       Patented June 20, 1916.

Application filed November 13, 1915. Serial No. 61,222.

*To all whom it may concern:*

Be it known that I, CHARLES SAGER TIPTON, a citizen of the United States, residing at Denver, in the county of Denver and State of Colorado, have invented certain new and useful Improvements in Saddles; and I do hereby declare the following to be a full, clear, and exact description of the invention, such as will enable others skilled in the art to which it appertains to make and use the same.

My invention relates to new and useful improvements in saddles and more particularly to that class used for riding purposes, and my object is to form a cantle of the saddle in such manner as to provide a firm seat for the rider and cause the body of the rider to conform to the movement of the animal. And a further object is to provide means in connection with the pommel of the saddle for engaging the upper portion of the leg of the rider.

Other objects and advantages will be hereinafter set forth and more particularly pointed out in the accompanying specification.

Figure 1:
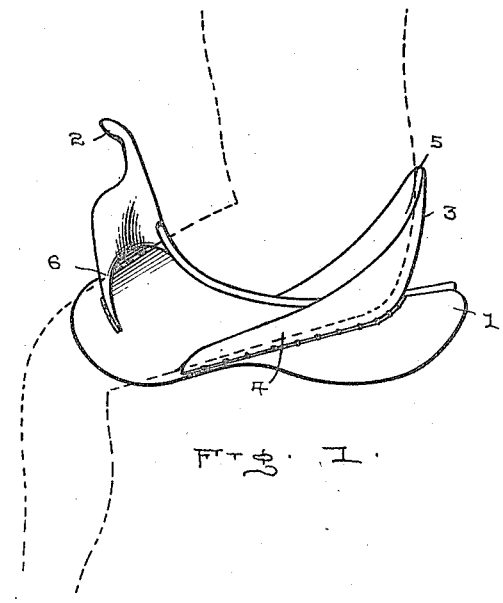
Figure 2:
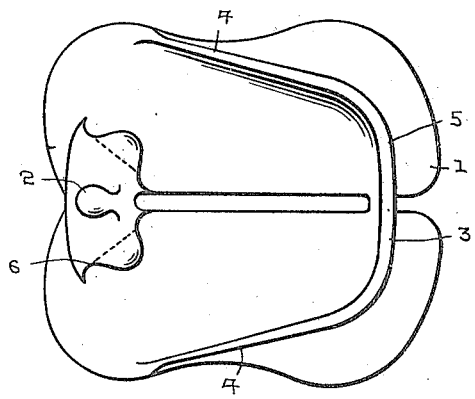

In the accompanying drawings which are made a part of this application, Figure 1 is a side elevation of parts of a saddle showing my improved attachments applied thereto, and Fig. 2 is a top plan view thereof.

Referring to the drawings in which similar reference numerals designate corresponding parts throughout the several views, 1 indicates the frame of the saddle which may be constructed in the usual or any preferred manner, the forward end thereof terminating in a pommel 2, while the cantle 3 is attached to the frame adjacent the rear end thereof, said cantle having side extensions 4 and a back portion 5, said side extensions gradually decreasing in height from their connection with the back portion to their forward edges. The side extensions 4 terminate at a point slightly in the rear of the pommel 2 thereby giving firm support to the body and legs of the rider and throwing the rider forward in the stirrup straps thereby causing the body of the rider to conform to the movement of the animal, said side extensions also trending downwardly and outwardly as well as forwardly. The construction of the cantle also throws the rider's body toward the pommel or fork of the saddle and to hold the body more firmly in the saddle the pommel 2 is hollowed out near its base on each side to form arches 6 into which fit the legs of the rider, thus rigidly holding the rider in the seat and preventing the rider from sliding backward and forward in the saddle.

This device can be very cheaply constructed and as the seat face of the cantle is curved to readily conform to the shape of the body of the rider, the saddle will be very comfortable for riding purposes and by providing the arched portions on the pommel of the saddle it will be much more difficult to dislodge the rider from the saddle. It will likewise be understood that by covering the parts of the saddle with buffed or rough surfaced leather the sliding motion of the body of the rider will be reduced to a minimum.

Having thus fully described my invention what I claim as new and desire to secure by Letters Patent of the United States, is:—

1. A saddle, comprising a frame, a cantle attached to the frame and having elongated tapering side extensions terminating at a point slightly removed from the forward end of said frame, and a pommel having arched portions on opposite sides thereof adjacent the ends of said extensions.

2. A saddle, comprising a frame, a pommel, and a cantle attached to the frame, said cantle comprising a back portion and forwardly extending side extensions, said extensions tapering from the back portion to their forward ends and gradually increasing a distance apart toward their forward ends and terminating substantially in the vertical plane of the pommel of the saddle.

3. A saddle, comprising a frame, a cantle on the frame, a pommel having cutaway portions at each side adjacent its connection with the frame to form arched portions, and side extensions upon said cantle coöperating with said pommel for retaining the thighs of the rider in said arched portions of said pommel.

In testimony whereof I have signed my name to this specification in the presence of two subscribing witnesses.

CHARLEY SAGER TIPTON.

Witnesses:
   MARIA THERESA HOECKLE,
   G. E. POLSON.